United States Patent
Goulier

(10) Patent No.: US 11,593,577 B2
(45) Date of Patent: Feb. 28, 2023

(54) METHOD FOR LIMITING THE VOLTAGE, LEVEL RECEIVED FROM A MAGNETIC FIELD BY A TRANSPONDER AND CORRESPONDING TRANSPONDER

(71) Applicant: STMicroelectronics SA, Montrouge (FR)

(72) Inventor: Julien Goulier, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 0 days.

(21) Appl. No.: 16/660,373

(22) Filed: Oct. 22, 2019

(65) Prior Publication Data

US 2020/0143124 A1    May 7, 2020

(30) Foreign Application Priority Data

Nov. 2, 2018 (FR) ........................ 1860141

(51) Int. Cl.
*G06K 7/10* (2006.01)
*H02M 7/217* (2006.01)
*H04B 5/00* (2006.01)

(52) U.S. Cl.
CPC ........ *G06K 7/10366* (2013.01); *H02M 7/217* (2013.01); *H04B 5/0037* (2013.01); *H04B 5/0062* (2013.01)

(58) Field of Classification Search
CPC . G06K 7/10366; H04B 5/0037; H04B 5/0062
See application file for complete search history.

(56) References Cited

U.S. PATENT DOCUMENTS

| | | | |
|---|---|---|---|
| 9,488,944 B2* | 11/2016 | Inukai | G03G 15/80 |
| 10,063,104 B2* | 8/2018 | Kurs | H02J 50/12 |
| 10,541,527 B2* | 1/2020 | Taft | H02H 9/046 |
| 2011/0287714 A1 | 11/2011 | Wilson et al. | |
| 2014/0036395 A1 | 2/2014 | Wilson | |
| 2016/0119033 A1* | 4/2016 | Tudose | H04B 5/0056 340/10.1 |
| 2019/0123556 A1* | 4/2019 | Fang | H01L 29/0847 |
| 2020/0143124 A1* | 5/2020 | Goulier | H04B 5/0062 |
| 2020/0382018 A1* | 12/2020 | Spinella | H02M 7/219 |
| 2021/0091655 A1* | 3/2021 | Hegde | H02M 7/797 |

FOREIGN PATENT DOCUMENTS

| | | |
|---|---|---|
| EP | 3113331 A1 | 1/2017 |
| JP | 4759053 B2 | 8/2011 |
| WO | 2007138690 A1 | 12/2007 |

* cited by examiner

*Primary Examiner* — Thien M Le
*Assistant Examiner* — Asifa Habib
(74) *Attorney, Agent, or Firm* — Slater Matsil, LLP

(57) ABSTRACT

A method for limiting voltage at an input of an integrated circuit of a transponder contactlessly communicating with a reader includes, during the contactless communication: receiving a carrier signal at an antenna of the transponder; and controlling gate voltages of two transistors of a rectifier circuit of the transponder so as to modify an input impedance of the integrated circuit, wherein the two transistors are cross-coupled between terminals of the antenna and a reference voltage.

22 Claims, 2 Drawing Sheets

METHOD FOR LIMITING THE VOLTAGE, LEVEL RECEIVED FROM A MAGNETIC FIELD BY A TRANSPONDER AND CORRESPONDING TRANSPONDER

CROSS-REFERENCE TO RELATED APPLICATIONS

This application claims priority to French Patent Application No. 1860141, filed on Nov. 2, 2018, which application is hereby incorporated herein by reference.

TECHNICAL FIELD

The present disclosure relates generally to an electronic system and method, and, in particular embodiments, to a method for limiting a voltage level received from a magnetic field by a transponder and corresponding transponder.

BACKGROUND

Contactless components or devices can be, for example, components or devices called "NFC" devices, i.e. devices compatible with NFC (Near Field Communication) technology.

The NFC device can be, for example, an integrated circuit or a chip incorporating an NFC microcontroller.

The acronym NFC denotes high-frequency, short-range, wireless communication technology that allows data exchanges between two contactless devices over a short distance, for example, 10 cm.

NFC technology is an open technological platform standardized, for example, in standard ISO/IEC 18092, ISO/IEC 21481, ISO 14443 or EMVCo.

In addition to its conventional telephone function, a cellular mobile telephone can be used (if it is equipped with specific means) to exchange information with another contactless device, for example, a contactless reader, using a contactless communication protocol that can be used in NFC technology.

Other contactless devices also can be cited, such as a connected watch.

This allows information to be exchanged between the contactless reader and secure elements located inside the mobile telephone. Numerous applications are thus possible, such as mobile ticketing for public transport (the mobile telephone acts as a transport ticket) or even mobile payment (the mobile telephone acts as a payment card).

When information is transmitted between a reader and a contactless label or card or an object emulated in label or card mode, the reader generates a magnetic field by using its antenna, which is generally in line with conventionally used standards, namely a sine wave at 13.56 MHz. The force of the magnetic field is, for example, between 0.5 and 7.5 Amperes/RMS (Root Mean Square) meter. The further away the reader or the label or card, the lower the force of the magnetic field. Conversely, the closer the reader and the label or card, the greater the force of the magnetic field.

Two operating modes are then possible, a passive mode or an active mode.

In the passive mode, only the reader generates a magnetic field and the object, emulated in label mode or card mode, is then passive and still acts as the target.

More specifically, the antenna of the object emulating the label or the card modulates the field generated by the reader.

This modification is performed by modifying the charge connected to the terminals of the antenna of the object.

By modifying the charge at the terminals of the antenna of the object, the output impedance of the antenna of the reader changes due to the magnetic coupling between the two antennas. This results in a change in the amplitudes and/or the phases of the voltages and currents present at the antenna of the reader and of the object.

Moreover, in this way, the information to be transmitted from the object to the reader is transmitted by charge modulation at the antenna currents of the reader.

In the active operating mode, the object can, for example, perform a passive communication assisted by a specific power supply source, for example, a battery, as is the case in a mobile telephone, in order to improve the performance of the object.

Furthermore, in order to communicate, the object and the reader can each alternately generate a magnetic field. In this case, the object is emulated in reader mode when it has to send data to the reader, which then operates in a receiver mode. This active communication mode is known to a person skilled in the art as "peer-to-peer" communication.

With respect to a passive communication mode, greater operating distances are obtained, which can range up to 20 cm depending on the protocol that is used.

The intensity of the magnetic field at the card or at the label mainly depends on the reader and on its position relative to the card/label. A high magnetic field can degrade the integrated circuit of the object emulated in card mode.

SUMMARY

Consequently, it is desirable to protect the integrated circuit of the object emulated in card mode while limiting the voltage originating from the magnetic field emitted by the reader.

Some embodiments relate to wireless or contactless communication using contactless devices or electronic components connected to an antenna. Some embodiments relate to devices configured to exchange information with a reader via the antenna in accordance with a communication protocol of the contactless type.

Some embodiments relate to contactless communication between a contactless device and a reader at a frequency of 13.56 MHz, such as NFC devices.

According to one aspect, a method is proposed for limiting the voltage at the input of an integrated circuit of a transponder contactlessly communicating with a reader, the transponder further comprising an antenna and a rectifier circuit comprising two transistors cross-coupled between the terminals of the antenna and a reference voltage, the method comprising, during the communication, controlling the gate voltages of the transistors so as to modify the input impedance of the integrated circuit.

Controlling the gate voltages of the transistors allows the impedance of the antenna, and therefore the input impedance of the integrated circuit, to be reduced. The reduction in the impedance of the antenna allows excessive energy at the antenna to be dissipated. This energy dissipation allows the voltage at the antenna to be reduced and consequently results in a limitation of the voltage at the input of the integrated circuit.

According to one embodiment, the communication comprises receiving a carrier signal at the terminals of the antenna that alternately and successively makes the two transistors conductive, and the control of the gate voltages comprises, when one of the transistors is made conductive by the carrier signal, configuring the other transistor as a current source.

The carrier signal is received by the terminals of the antenna. In some embodiments, the carrier signal, which is characterized by being full-wave, allows the two transistors to be alternately and successively made conductive.

The term "transistor made conductive" is typically understood to be a transistor in the fully on state, i.e. equivalent to a short-circuit.

According to one embodiment, configuring a transistor as current source comprises applying a control voltage to the gate of said transistor.

In some embodiments, the control voltages on the gates of transistors configured as current source can be identical.

Nonetheless, according to one embodiment, controlling the gate voltages can comprise successive configurations of the two transistors as current source through the respective application of two different control voltages.

The terminals of the antenna can be asymmetrical. In some embodiments, it is advantageous for two different control voltages to be applied to the two transistors, i.e. a first control voltage applied to the first transistor and a second control voltage, different from the first control voltage, applied to the second transistor.

The two transistors can be of the NMOS type and the reference voltage is then the ground.

The two transistors can be of the PMOS type and the reference voltage is then a power supply voltage, e.g., such as a positive voltage.

According to another aspect, a transponder is proposed that is configured to contactlessly communicate with a reader. The transponder comprises an integrated circuit, an antenna and a rectifier circuit comprising two transistors cross-coupled between the terminals of the antenna and a reference terminal intended to receive a reference voltage, and control circuit capable of, during a communication between the reader and the transponder, controlling the gate voltages of the transistors so as to modify the input impedance of the integrated circuit.

According to one embodiment, the two terminals of the antenna are intended to receive, during the communication, a carrier signal that alternately and successively makes the two transistors conductive and the control circuit is capable of, when one of the transistors is made conductive by the carrier signal, configuring the other transistor as current source.

According to one embodiment, in order to configure a transistor as current source, the control circuit is capable of applying a control voltage to the gate of the transistor.

According to one embodiment, the control circuit is capable of successively configuring the two transistors as current source through the respective application of a first and a second different control voltage.

According to one embodiment, the control circuit comprises two capacitors, the two transistors being cross-coupled by using the two capacitors, and two auxiliary transistors respectively coupled between the gates of the two transistors and a terminal delivering the control voltage.

According to one embodiment, the control circuit comprises a first part and a second part configured to generate the control voltage, each part comprising two diodes coupled to the ground by using a resistor.

According to one embodiment, the two transistors are of the NMOS type and the reference voltage is ground.

According to one embodiment, the two transistors are of the PMOS type and the reference voltage is a power supply voltage.

According to another aspect, a device, such as a smart card or a telephone, is proposed that comprises the transponder.

BRIEF DESCRIPTION OF THE DRAWINGS

Further advantages and features of the invention will become apparent upon reading the detailed description of embodiments, which are by no means limiting, and with reference to the accompanying drawings, in which.

DETAILED DESCRIPTION OF ILLUSTRATIVE EMBODIMENTS

Figure 1:
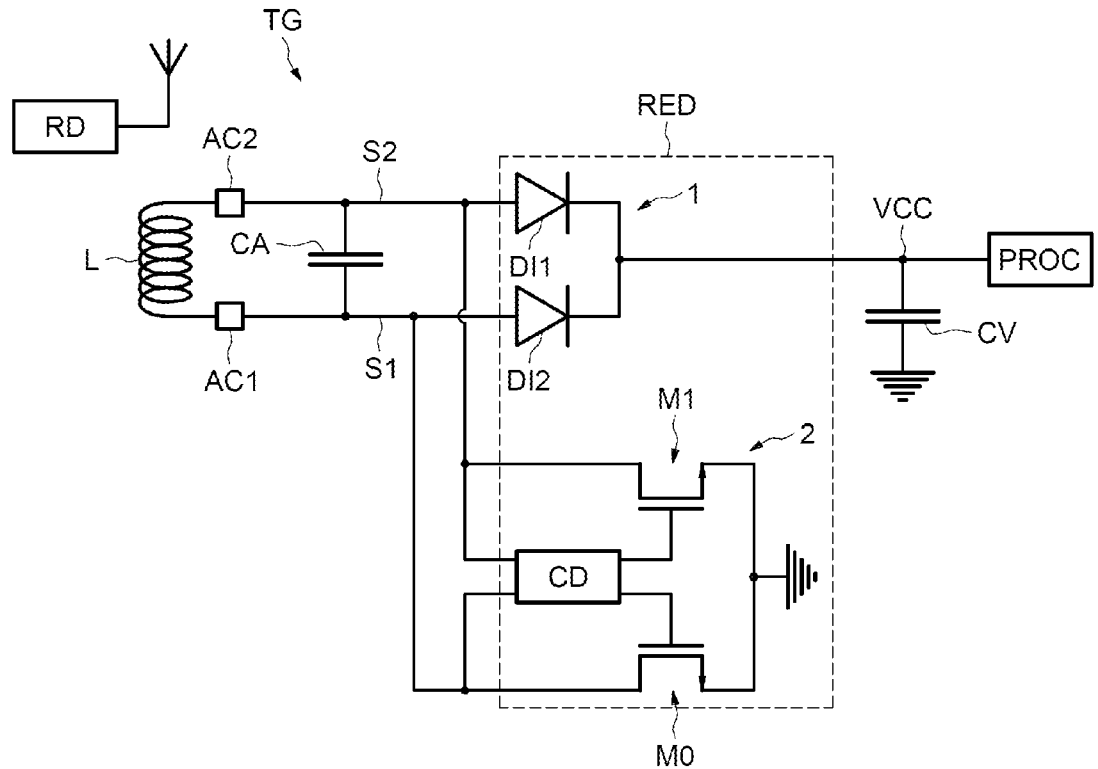
FIGS. 1, 2A, 2B, 3A and 3B schematically show various embodiments of the invention.

In FIG. 1, reference sign TG denotes a transponder, which can, for example, communicate with a reader RD via an antenna, for example, an induction coil L. Transponder TG may include an integrated circuit that includes rectifier circuit RED. In some embodiments, the integrated circuit also includes processing circuit PROC. In some embodiments, the integrated circuit also includes capacitors CA and/or CV. In some embodiments, rectifier circuit RED is implemented in a first integrated circuit and processing circuit PROC is implemented in a second integrated circuit. Other implementations are also possible.

The antenna comprises two terminals AC1 and AC2 coupled to a tuning capacitor CA configured to adjust the resonant frequency of the transponder around the frequency of the carrier signal. The frequency of the carrier signal is equal to 13.56 MHz, for example.

The terminal AC1 delivers a signal S1 and the terminal AC2 delivers a signal S2. The signals S1 and S2 represent the carrier signal.

The two terminals AC1 and AC2 alternate between a high state and a low state.

The term "high state" is understood to be a positive voltage, for example, and the term "low state" is understood to be a negative voltage, for example.

The transponder TG also comprises a rectifier circuit RED configured to rectify the negative half-waves and to preserve the positive half-waves of the received carrier signal S1, S2 at the two terminals AC1 and AC2.

The rectifier circuit RED is coupled to a capacitor CV configured to preserve only the direct component VCC of the carrier signal. In other words, the carrier signal, which is initially alternating, is converted to a direct signal (or direct voltage) VCC.

The transponder TG also comprises a processing circuit PROC coupled to the capacitor CV. The processing circuit PROC can be, for example, a microprocessor supplied by the direct signal VCC and configured to process the data transmitted by the reader RD.

The rectifier circuit RED comprises a first part 1 comprising a first diode DI1 coupled to the terminal AC2 and configured to allow through the signal S2 when it is in a high state. The first part 1 also comprises a second diode DI2 coupled to the terminal AC1 and configured to allow through the signal S1 when it is in a high state.

The rectifier circuit RED also comprises a second part 2 comprising two transistors M0, M1 that are cross-coupled, by using control circuit CD, between the terminals AC1 and AC2 of the antenna and a reference voltage.

More specifically, the control circuit CD is coupled to the gates of the two transistors M0, M1 and is configured to control the gate voltages of each transistor.

In this embodiment, the two transistors M0, M1 are of the NMOS type and are coupled to the reference voltage, which in this case is ground.

Figure 2A:
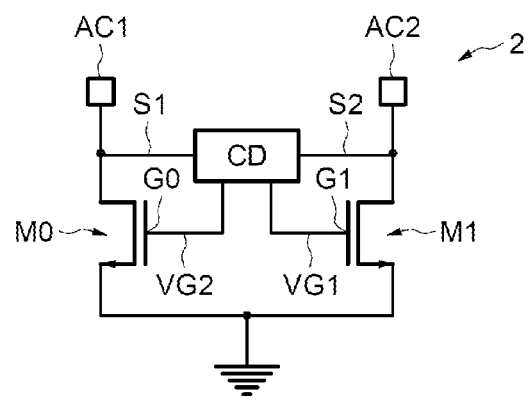

FIG. 2A shows a detailed view of the second part 2 of the rectifier circuit RED comprising the two transistors M0 and M1.

The control circuit CD is coupled to the terminal AC1 and is configured to receive the signal S1. The control circuit CD is also coupled to the terminal AC2 and is configured to receive the signal S2.

The gate G0 of the transistor M0 and the gate G1 of the transistor M1 are coupled to the control circuit CD. The control circuit CD is configured to control the gate G0 of the transistor M0 using a control signal VG2.

The control circuit CD is also configured to control the gate G1 of the transistor M1 using a control signal VG1.

When the signal S1 delivered by the terminal AC1 is in a high state, the control circuit CD delivers the control signal VG1 in a high state. The transistor M1 is made conductive and consequently connects the terminal AC2 to ground.

Figure 2B:
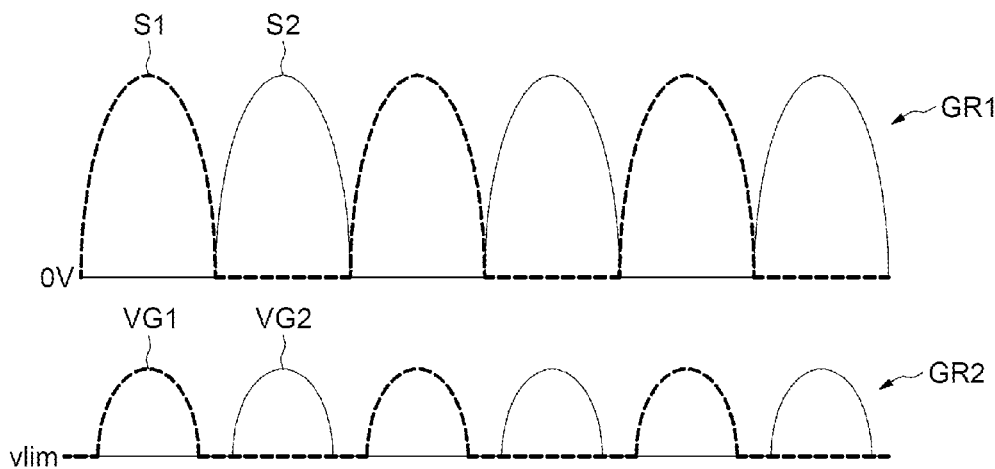

At the same time, the control circuit CD delivers the control signal VG2 so as to configure the transistor M0 as a current source. The control signal VG2 is a control voltage vlim, as shown in FIG. 2B.

The control signal VG2 allows the voltage of the signal S1 to be limited by circulating the current from the terminal AC1 to the terminal AC2 and consequently allows the impedance at the antenna to be reduced.

Reducing the impedance of the antenna allows excessive energy to be dissipated at the antenna and consequently allows the voltage at the antenna to be reduced.

When the signal S2 delivered by the terminal AC2 is in a high state, the control circuit CD delivers the control signal VG2 in a high state. The transistor M0 is made conductive and consequently connects the terminal AC1 to the ground.

At the same time, the control circuit CD delivers the control signal VG1 (control voltage vlim) so as to configure the transistor M1 as a current source.

The control signal VG1 allows the voltage of the signal S2 to be limited by circulating the current from the terminal AC2 to the terminal AC1 and consequently allows the impedance at the antenna to be reduced.

It is to be noted that the control voltages VG1 and VG2 can be substantially equal or different.

FIG. 2B shows a first graph GR1 showing the evolution of the voltage S1 and S2 as a function of time.

FIG. 2B also shows a second graph GR2 showing the evolution of the two voltages VG1 and VG2 as a function of time once the gates G0, G1 of the two transistors M0, M1 are controlled by the control circuit CD.

The first graph GR1 shows the full-wave of the carrier signal.

The amplitude of the signal S1 in the high state in the first graph GR1 is due to controlling the gate G0 of the transistor M0 using the control voltage VG2 that is substantially equal to the control voltage vlim.

The amplitude of the signal S2 in the high state in the first graph GR1 is due to controlling the gate G1 of the transistor M1 using the control voltage VG1 that is substantially equal to the control voltage vlim.

Figure 3A:
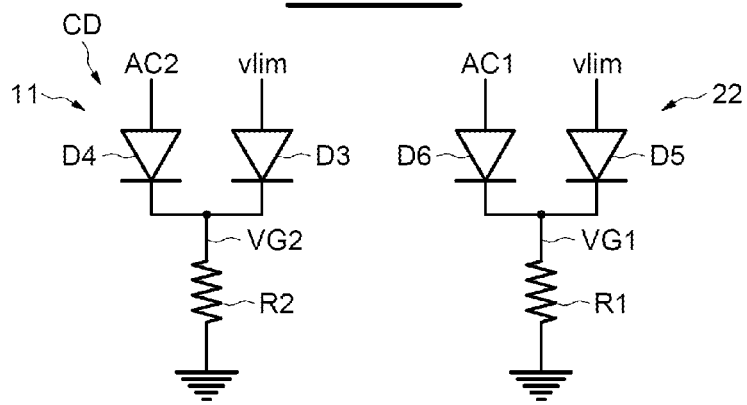

FIG. 3A shows an embodiment of the control circuit CD.

The control circuit CD comprises a first part 11 configured to generate the control signal VG2 and a second part 22 configured to generate the control signal VG1.

The first part 11 comprises a third diode D3, the anode of which is coupled to the terminal delivering the control voltage vlim, and a fourth diode D4, the anode of which is coupled to the terminal AC2.

The cathodes of the third diode D3 and of the fourth diode D4 are coupled together and to ground by a resistor R2.

If the voltage at the terminal AC2 is greater than the control voltage vlim, the voltage of the control signal VG2 will be substantially equal to the voltage at the terminal AC2.

If the voltage at the terminal AC2 is less than the control voltage vlim, the voltage of the control signal VG2 will be substantially equal to the control voltage vlim.

The second part 22 comprises a fifth diode D5, the anode of which is coupled to the terminal delivering the control voltage vlim, and a sixth diode D6, the anode of which is coupled to the terminal AC1.

The cathodes of the fifth diode D5 and of the sixth diode D6 are coupled together and to the ground by a resistor R1.

If the voltage at the terminal AC1 is greater than the control voltage vlim, the voltage of the control signal VG1 will be substantially equal to the voltage at the terminal AC1.

If the voltage at the terminal AC1 is less than the control voltage vlim, the voltage of the control signal VG1 will be substantially equal to the control voltage vlim.

Figure 3B:
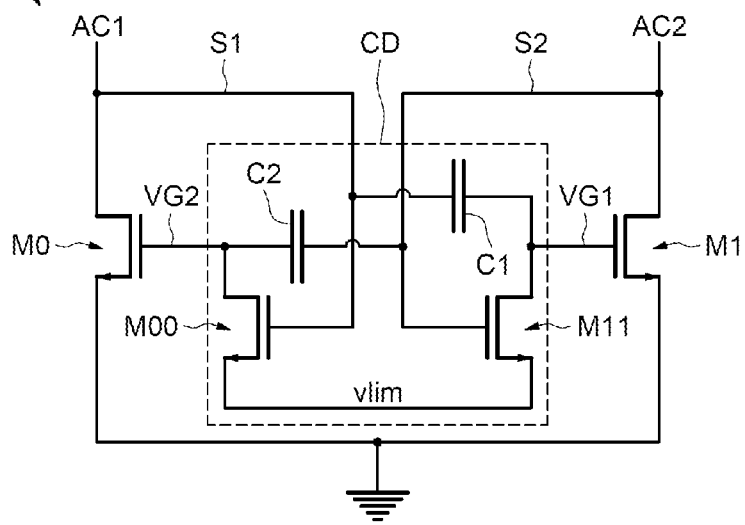

FIG. 3B shows another embodiment of the control circuit CD.

The control circuit CD comprises a first capacitor C1, a second capacitor C2, a first auxiliary transistor M00, and a second auxiliary transistor M11, where the first and second auxiliary transistors M00 and M11 are of the NMOS type.

The terminal AC1 is coupled to the first capacitor C1 and to the gate of the first auxiliary transistor M00.

The terminal AC2 is coupled to the second capacitor C2 and to the gate of the second auxiliary transistor M11.

The first capacitor C1 is also coupled to the gate of the second transistor M1 and to the gate of the first auxiliary transistor M00.

The second capacitor C2 is coupled to the gate of the first transistor M0 and to the gate of the second auxiliary transistor M11.

A first conduction electrode (the drain) of the first auxiliary transistor M00 is coupled to an electrode of the second capacitor C2, with its second conduction electrode (source) being coupled to the terminal delivering the control voltage vlim.

A first conduction electrode (the drain) of the second auxiliary transistor M11 is coupled to an electrode of the first capacitor C1, with its second conduction electrode (source) being coupled to the terminal delivering the control voltage vlim.

The control circuit CD operates as follows: if the signal S1 delivered by the terminal AC1 is in the high state, the first capacitor C1 charges. The equivalent voltage VG1 at the first capacitor is substantially equal to the voltage of the signal S1 and therefore of the carrier signal.

The second transistor M1 is made conductive. The terminal AC2 is coupled to ground.

The first auxiliary transistor M00 is also made conductive and allows circulation of the charges stored in the second capacitor C2 corresponding to the control voltage VG2. The control voltage VG2 is substantially equal to the control voltage vlim.

The first transistor M0 is configured as a current source and is controlled by the control voltage VG2, which allows the voltage of the signal S1, and therefore of the carrier signal, to be limited.

Once the signal S2 is in the high state, the first transistor M0 is made conductive. The terminal AC1 is coupled to ground.

The second auxiliary transistor M11 is also made conductive and allows circulation of the charges stored in the first capacitor C1 corresponding to the control voltage VG1. The control voltage VG1 is substantially equal to the control voltage vlim.

The second transistor M1 is configured as a current source and is controlled by the control voltage VG1, which allows the voltage of the signal S2, and therefore of the carrier signal, to be limited.

Some embodiments thus advantageously allow the voltage at the terminals of the antenna, and therefore at the input of the integrated circuit, to be reduced by using the two transistors of the rectifier when they are not in the on-state.

Thus, without the voltage vlim, the maximum voltage at the terminals of the antenna would be, for example, 28 Volts for a magnetic excitation of 1.5 A/m.

In some embodiments, the maximum voltage at the terminals of the antenna would be, for example, 6.4 Volts with a voltage vlim equal to 0.8 Volts, and it would be reduced, for example, to 3.1 Volts with a voltage vlim equal to 0.9 Volts.

The invention is not limited to the embodiments described above.

Thus, for example, while the various described transistors are MOS transistors, it would be possible to use PMOS transistors, with the reference voltage then being the power supply voltage instead of ground.

What is claimed is:

1. A method for limiting voltage at an input of an integrated circuit of a transponder contactlessly communicating with a reader, the method comprising, during the contactless communication:
receiving a carrier signal at an antenna of the transponder; and
controlling gate voltages of first and second transistors of a rectifier circuit of the transponder so as to modify an input impedance of the integrated circuit, wherein the first transistors has a current path coupled between a first terminal of the antenna and a reference terminal receiving a reference voltage, wherein the second transistor has a current path coupled between a second terminal of the antenna and the reference terminal, wherein the first terminal of the antenna is operatively coupled to a gate of the second transistor, and wherein the second terminal of the antenna is operatively coupled to a gate of the first transistor.

2. The method of claim 1, wherein the contactless communication comprises receiving the carrier signal at the first and second terminals of the antenna that alternately and successively makes the first and second transistors conductive, and wherein controlling the gate voltages of the first and second transistors comprises, when one transistor of the first and second transistors is made conductive by the carrier signal, operating the other transistor of the first and second transistors as a current source.

3. The method of claim 2, operating the other transistor as a current source comprises applying a control voltage to a gate of the other transistor.

4. The method of claim 1, wherein controlling the gate voltages of the first and second transistors comprises successive configurations of the first and second transistors as current sources through respective application of two control voltages.

5. The method of claim 4, wherein the two control voltages are different.

6. The method of claim 1, wherein the first and second transistors are metal-oxide semiconductor (MOS) transistors of the N-type, and wherein the reference voltage is ground.

7. The method of claim 1, wherein the first and second transistors are metal-oxide semiconductor (MOS) transistors of the P-type, and wherein the reference voltage is a positive power supply voltage.

8. The method of claim 1, wherein the carrier signal has a frequency of about 13.56 MHz.

9. A transponder comprising:
first and second antenna terminals configured to be coupled to an antenna;
a rectifier circuit that comprises first and second transistors; and
a control circuit configured to, during a communication between a reader and the transponder, control gate voltages of the first and second transistors so as to modify an input impedance at the first and second antenna terminals, wherein the first transistors has a current path coupled between the first antenna terminal and a reference terminal configured to receive a reference voltage, wherein the second transistor has a current path coupled between the second antenna terminal and the reference terminal, wherein the first antenna terminal is operatively coupled to the gate of the second transistor, and wherein the second antenna terminal is operatively coupled to the gate of the first transistor.

10. The transponder of claim 9, wherein the first and second antenna terminals are configured to receive, during the communication, a carrier signal alternately and successively making the first and second transistors conductive, and wherein the control circuit is configured to operate one transistor of the first and second transistors as a current source when the other transistor of the first and second transistors is made conductive by the carrier signal.

11. The transponder of claim 10, wherein the control circuit is configured to operate the one transistor as a current source by applying a control voltage to a gate of the one transistor.

12. The transponder of claim 11, wherein the control circuit is configured to successively operate the first and second transistors as current sources through respective application of two different control voltages.

13. The transponder of claim 11, wherein the control circuit comprises first and second capacitors and two auxiliary transistors, wherein the gate of the first transistor is operatively coupled to the second antenna terminal via the first capacitor, wherein the gate of the second transistor is operatively coupled to the first antenna terminal via the second capacitor, and wherein the two auxiliary transistors are respectively coupled between gates of the first and second transistors and a terminal configured to deliver the control voltage.

14. The transponder of claim 11, wherein the control circuit comprises a first part and a second part configured to generate the control voltage, and wherein each part of the first and second parts comprises two diodes coupled to ground via respective resistors.

15. The transponder of claim 9, wherein the first and second transistors are metal-oxide semiconductor (MOS) transistors of the N-type, and wherein the reference voltage is ground.

16. The transponder of claim 9, wherein first and second two transistors are metal-oxide semiconductor (MOS) transistors of the P-type, and wherein the reference voltage is a positive power supply voltage.

17. The transponder of claim 9, wherein the transponder is part of a smart card or a telephone.

18. A transponder comprising:
first and second antenna terminals; and
a rectifier circuit coupled to the first and second antenna terminals, wherein the rectifier circuit comprises:
   a rectifier output terminal,
   a first diode coupled between the first antenna terminal and the rectifier output terminal,
   a second diode coupled between the second antenna terminal and the rectifier output terminal,
   a first transistor having a current path coupled between the first antenna terminal and a reference terminal,
   a second transistor having a current path coupled between the second antenna terminal and the reference terminal, and
   a control circuit configured to provide first and second voltages to respective control terminals of the first and second transistors, so that the first transistor is conductive when the second transistor is operating as a current source, and the second transistor is conductive when the first transistor is operating as a current source, wherein the first antenna terminal is operatively coupled to the control terminal of the second transistor, and wherein the second antenna terminal is operatively coupled to the control terminal of the first transistor.

19. The transponder of claim 18, wherein the control circuit comprises:
a third diode coupled between the second antenna terminal and the control terminal of the first transistor;
a fourth diode coupled between a first voltage node and the control terminal of the first transistor;
a first resistor coupled between the control terminal of the first transistor and the reference terminal;
a fifth diode coupled between the first antenna terminal and the control terminal of the second transistor;
a sixth diode coupled between the first voltage node and the control terminal of the second transistor; and
a second resistor coupled between the control terminal of the second transistor and the reference terminal.

20. The transponder of claim 18, wherein the control circuit comprises:
a first capacitor coupled between the first antenna terminal the control terminal of the second transistor;
a second capacitor coupled between the second antenna terminal the control terminal of the first transistor;
a third transistor having a current path coupled between the control terminal of the first transistor and a first voltage node, and a control terminal coupled to the first antenna terminal; and
a fourth transistor having a current path coupled between the control terminal of the second transistor and the first voltage node, and a control terminal coupled to the second antenna terminal.

21. The transponder of claim 18, further comprising a microprocessor coupled to the rectifier output terminal.

22. The transponder of claim 9, wherein the rectifier circuit further comprises:
a rectifier output terminal;
a first diode coupled between the first antenna terminal and the rectifier output terminal; and
a second diode coupled between the second antenna terminal and the rectifier output terminal.

* * * * *